United States Patent
Kitamura

(10) Patent No.: US 7,661,252 B2
(45) Date of Patent: Feb. 16, 2010

(54) GROUND SURFACE SLIDE GUIDE OF A GRASS CUTTER AND GRASS CUTTER

(75) Inventor: Kiyoshi Kitamura, Tsu (JP)

(73) Assignee: Kabushiki Kaisha Kitamura Seisakusho, Mie (JP)

( * ) Notice: Subject to any disclaimer, the term of this patent is extended or adjusted under 35 U.S.C. 154(b) by 0 days.

(21) Appl. No.: 12/282,863

(22) PCT Filed: Mar. 7, 2007

(86) PCT No.: PCT/JP2007/054459

§ 371 (c)(1),
(2), (4) Date: Dec. 19, 2008

(87) PCT Pub. No.: WO2007/108326

PCT Pub. Date: Sep. 27, 2007

(65) Prior Publication Data

US 2009/0100815 A1    Apr. 23, 2009

(30) Foreign Application Priority Data

Mar. 20, 2006 (JP) .............................. 2006-077120
Aug. 2, 2006 (JP) .............................. 2006-211429
Nov. 24, 2006 (JP) .............................. 2006-317716

(51) Int. Cl.
*A01D 34/00* (2006.01)

(52) U.S. Cl. ........................................ 56/12.7; 56/17.2

(58) Field of Classification Search .................. 56/12.7, 56/17.2, DIG. 3; 30/276
See application file for complete search history.

(56) References Cited

U.S. PATENT DOCUMENTS 5,430,943 A * 7/1995 Lee ............................ 30/347
6,032,369 A * 3/2000 Tada et al. .................... 30/276
6,065,214 A * 5/2000 Nagashima .................. 30/276

(Continued)

FOREIGN PATENT DOCUMENTS

JP          4-25401 U          2/1992

(Continued)

OTHER PUBLICATIONS

International Search Report for the Application No. PCT/JP2007/054459 mailed Jun. 12, 2007.

(Continued)

*Primary Examiner*—Alicia M Torres
(74) *Attorney, Agent, or Firm*—Cheng Law Group, PLLC

(57) ABSTRACT

The present invention relates to a ground surface slide guide having a resin body made of synthetic resin, and a metal hub integrally coupled to the resin body to rotate together. The resin body is composed of a tubular body and a flange extending upward to the outside from the entire periphery of the lower end of the tubular body and covering the lower surface of the rotary blade. A blade retaining ring pressed against the lower surface of the rotary blade is formed on the outer periphery of the hub, and the blade retaining ring is exposed to the upper end surface of the tubular body. The hub is attached to a drive shaft by a fastener, and the rotary blade is clamped between a blade rest and a blade retaining ring. The lower end of the tubular body serves as a ground contact surface.

11 Claims, 3 Drawing Sheets

U.S. PATENT DOCUMENTS 6,817,102 B2 * 11/2004 Harris et al. .................. 30/276

FOREIGN PATENT DOCUMENTS

| JP | 9-172840 A | 7/1997 |
|---|---|---|
| JP | 11-122705 A | 4/1999 |
| JP | 11-168956 A | 6/1999 |
| JP | 2002-136208 A | 5/2002 |
| JP | 2004-16137 A | 1/2004 |
| JP | 2005-119803 A | 5/2005 |
| JP | 2005-333871 A | 12/2005 |

OTHER PUBLICATIONS

Notification of Reasons for Refusal for the Application No. 2006-211429 from Japan Patent Office mailed Oct. 20, 2009.

* cited by examiner

GROUND SURFACE SLIDE GUIDE OF A GRASS CUTTER AND GRASS CUTTER

TECHNICAL FIELD

The present invention relates to a ground surface slide guide of a grass cutter for cutting grass and a grass cutter, and more particularly, relates to a ground surface slide guide, attached to the lower surface of a rotary blade of a grass cutter, that facilitates maintaining the rotary blade at a fixed height above the ground during grass cutting, and to a grass cutter equipped with this ground surface slide guide.

BACKGROUND ART

In a typical grass cutter, a structure is employed in which a rotary blade is positioned between a blade rest sleeve that rotates together with a drive shaft around the outer periphery of a rotating drive shaft and a blade retaining plate installed on the end of the drive shaft, and the rotary blade is attached by clamping the rotary blade between the blade rest sleeve and the blade retaining plate by tightening a nut. A grass cutter disclosed in Japanese Patent Application Laid-open No. H9-172840 teaches that grass cutting work can be carried out comfortably by attaching a ground surface slide guide to the lower surface side of a rotary blade and allowing this ground surface slide guide to contact the surface of the ground during grass cutting. In addition, since this ground surface slide guide is provided in the form of a metal-made article making it heavy, only a small such slide guide can be used in consideration of workability, thereby resulting in the problem of having insufficient stability with respect to the surface of the ground. Moreover, since this ground surface slide guide is formed by pressing a single metal sheet, the thickness of the location that contacts the ground is the same as that of other locations, thereby resulting in the problem of the location that contacts the ground becoming worn as a result of use and failing comparatively at a comparatively early stage of its service life.

DISCLOSURE OF THE INVENTION

With the foregoing in view, an object of the present invention is to provide a ground surface slide guide having light weight and a large diameter for enhancing stability with respect to the surface of the ground enabling grass cutting work to be carried out comfortably while also having a long service life.

The ground surface slide guide (60) in accordance with the present invention is adapted for use with a grass cutter having a rotary blade (50) as being attached to the lower surface of the rotary blade so as to rotate together with the rotary blade. The grass cutter has a drive shaft (32), and a blade rest (40) mounted on the outer periphery of the drive shaft and rotating together with the drive shaft. The ground surface slide guide (60) includes a resin body (70) molded of a synthetic resin, and a metal hub (80) coupled so as to integrally rotate with the resin body. The resin body (70) is composed of a tubular body (72) and a flange (74) extending upward to the outside from the entire periphery of the lower end of the tubular body and covering the lower surface of the rotary blade. A blade retaining ring (84) is formed on the outer periphery of the hub (80) for pressed engagement against the lower surface of the rotary blade. The blade retaining ring (84) is exposed to the upper end surface of the tubular body, and the tubular body is formed in its inner side with a recess (62) that opens to the lower surface of the ground surface slide guide. The hub (80) is formed in its center with a mounding hole (82) through which the drive shaft passes such that the rotary blade is fixed to the drive shaft as being clamped between the blade rest (40) and the blade retaining ring (84) by means of a fastener (36) located in the recess to come into a threaded engagement with the end of the drive shaft. The tubular body (72) has a thickness which is greater towards its lower end than at said flange, and forms a ground contact surface at its lower end. In this manner, since metal hub (80) for fixing the rotary blade to the drive shaft is coupled so as to integrally rotate together with the resin body (70) molded of the synthetic resin, the overall weight of the ground surface slide guide is reduced by use of the resin body (70), the lower surface of the rotary blade can be covered over a wide range and stability with respect to the ground surface can be improved, thereby enabling grass cutting work to be carried out comfortably. In addition, since the thickness of the lower end of the tubular body where the ground surface slide guide contacts the ground is greater than the thickness of other portions, wear resistance performance is enhanced, thereby making it possible to improve the durability of the ground surface slide guide.

The ground contact surface of the lower end of the tubular body (72) preferably has a convex curved surface. As a result, contact resistance with the ground can be reduced thereby enabling grass cutting work to be carried out smoothly.

In a preferred embodiment, the metal hub (80) is inserted into the resin body (70) to enhance the reliability of coupling between the resin body and hub. The blade retaining ring (84) is formed with a plurality of circumferentially spaced through-holes (85) which are filled with the resin that forms the resin body to give resin sites (75) exposed to the upper surface of the retaining ring. The blade retaining ring (84) is formed on its upper surface with a circumferentially extending annular protruding rib (86) that is pressed against the rotary blade. The annular protruding rib (86) is interrupted by the resin sites (75). The resin sites lie in the same plane as the upper surface of the blade retaining ring (84) and are lower than the protruding rib. With the presence of the annular protruding rib on the upper surface of the retaining ring, the rotary blade can be stably attached to the drive shaft without shifting from the center of the shaft. In addition, although being interrupted by the resin sites (75), the annular protruding rib extends almost completely in a circumferential direction to constitute a substantially circular rib protruding on the blade retaining ring (84) for constant engagement around its entire circumference with the rotary blade even when the metal-made hub (80) suffers from a warp or distortion developed around the through-holes or steps when being press-formed, thereby enabling a secure attachment to the blade.

Moreover, in a preferable embodiment, a wear-indicative indentation (77) for indicating wear is formed in a portion of the upper surface of the flange near the lower end of the tubular body, and the thickness of the flange at the portion where the indentation is formed is less than that of other portions. As the lower surface of the flange becomes worn at a portion where the indentation is provided due to friction with the ground during a long-term use, the indentation penetrates the lower surface of the flange and is visualized as a hole, thereby making it possible to judge the time when the ground surface slide guide is to be replaced. In addition, since the indentation is formed in the upper surface of the flange, smooth contact between the flange and ground can be maintained without causing any adverse effect in contacting with the ground until the time for replacement is reached.

Still further, a cutting string (90) may be removably attached to the resin body (70). As a result, grass cutting can be carried out by combining the use of a rotary blade and the cutting string. The use of the cutting string of a length such that the end thereof protrudes to the outside beyond the rotary blade enables grass located near obstacles such as walls, stones or trees to be cut safely with the flexible cutting string without the rotary blade making contact with such obstacles.

The hub may be formed at a portion side of and lower than the blade retaining ring with an auxiliary retaining ring (88) exposed to the inside of the tubular body (72). The auxiliary retaining ring is shaped to be engageable with a boss (42) formed at the center of the blade rest (40) and extending into a center shaft hole of the rotary blade (50). In the case of attaching the ground surface slide guide provided with the cutting string without attaching the rotary blade, by setting the location of the auxiliary retaining ring (88) so that the auxiliary retaining ring makes contact with the boss of the blade rest in the state in which the upper surface of the blade retaining ring (84) is at a distance from the blade rest (40), a clamping force acts on the blade rest (40) serving as the contact surface with the rotary blade and the blade retaining ring (84), thereby making it possible to prevent the occurrence of deformation in these portions while still enabling the ground surface slide guide (60) to be reliably fixed to the drive shaft.

BEST MODE FOR CARRYING OUT THE INVENTION

Figure 1:
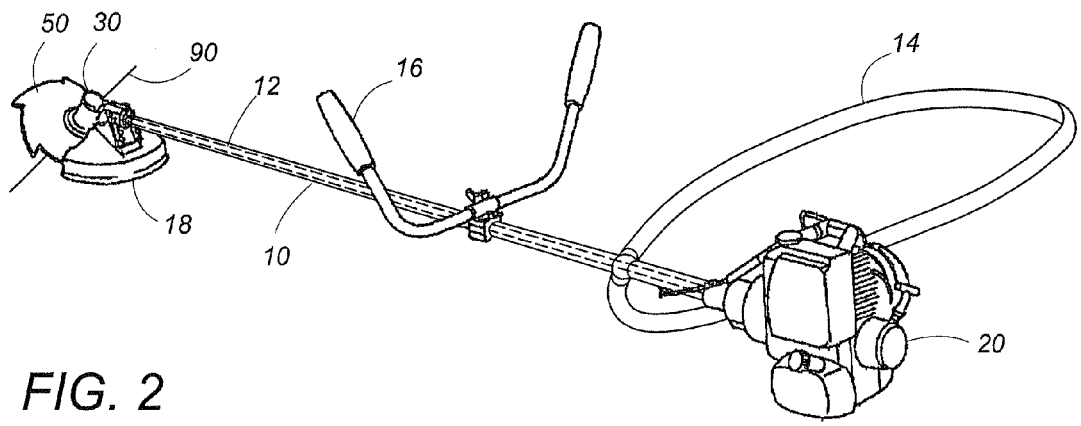
FIG. 1 is a perspective view showing a grass cutter to which the ground surface slide guide of the present invention is attached.

The following provides an explanation of a ground surface slide guide in accordance with an embodiment of the present invention based on the attached drawings. FIG. 1 shows a grass cutter to which a ground surface slide guide is attached. The grass cutter is typically provided with a pipe 10 having an engine 20 installed on one end thereof, and a grass cutting head 30 attached to the other end of pipe 10, and a rotary shaft 12 rotated by engine 20 extends to grass cutting head 30 through pipe 10. Grass cutting head 30 is provided with a drive shaft 32 that rotates coupled to rotary shaft 12, and a rotary blade 50 referred to as a tip saw is removably attached to this drive shaft 32. A shoulder strap 14 for hanging the grass cutter from the shoulder of a user, a handle 16 held in the hands of a user, and a safety cover 18 covering a portion of rotary blade 50 are attached to pipe 10.

Figure 2:
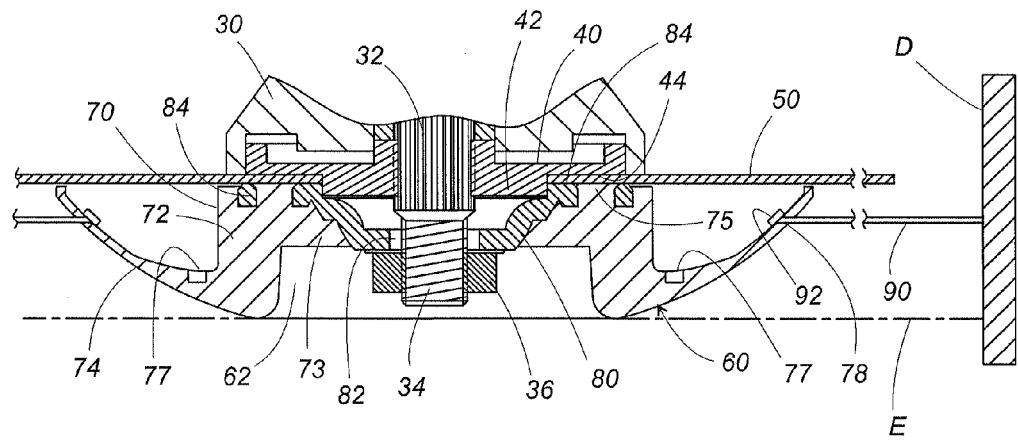
FIG. 2 is a cross-sectional view showing the state in which a ground surface slide guide is attached to a drive shaft of the grass cutter in accordance with an embodiment of the present invention.

As shown in FIG. 2, grass cutting head 30 is provided with a blade rest sleeve in the form of blade rest 40, which rotates together with drive shaft 32 by being spline-coupled to drive shaft 32, and a boss 42 inserted into a circular shaft hole in the center of rotary blade 50 is formed in the center of this blade rest 40. Male threads 34 are provided on the end of drive shaft 32, and ground surface slide guide 60 is attached to drive shaft 32 by a nut in the form of a fastener 36. Rotary blade 50 is fixed to drive shaft 32 by being clamped between the guide 60 and blade rest surface 44 around the periphery of boss 42 of the blade rest sleeve.

Figure 3:
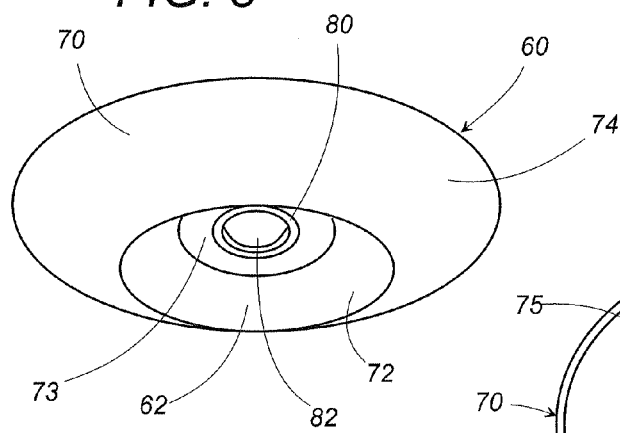
FIG. 3 is a perspective view of the above ground surface slide guide as viewed on an angle from below.
Figure 4:
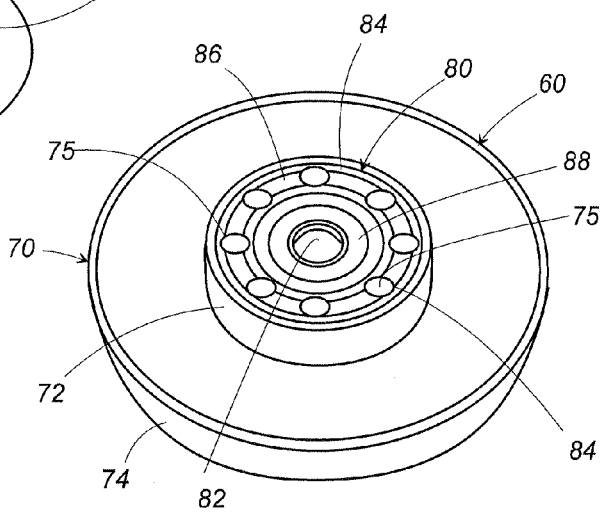
FIG. 4 is a perspective view of the above ground surface slide guide as viewed on an angle from above.
Figure 5:
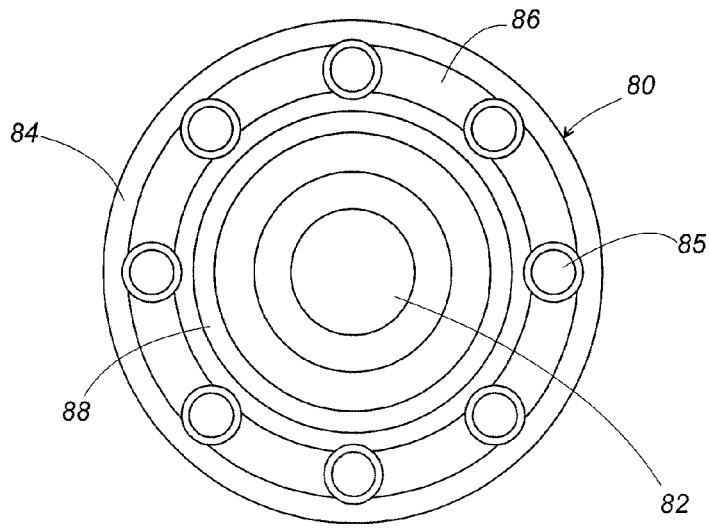
FIG. 5 is an overhead view showing a hub inserted into the above ground surface slide guide.
Figure 6:
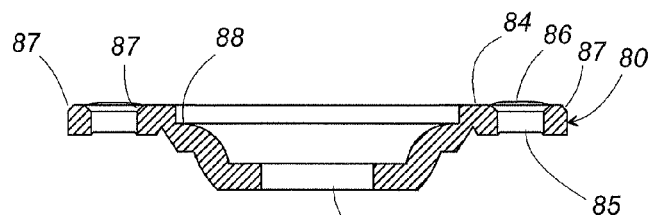
FIG. 6 is a cross-sectional view of the above hub.

Ground surface slide guide 60, which rotates together with rotary blade 50 and makes sliding contact with a ground surface E, is able to maintain rotary blade 50 at a fixed height above ground surface E, and is used to comfortably carry out grass cutting work in which the grass cutter is swung to the left and right. As shown in FIGS. 2 to 4, the ground surface slide guide 60 is composed of a resin body 70 in the form of a resin molded article and a metal hub 80 inserted into this resin body 70. Resin body 70 is molded with a resin such as high-strength Nylon to exhibit superior wear resistance, and has a tubular body 72 and a flange 74 extending upward at an angle from the entire periphery of the lower end of this tubular body.

As shown in FIGS. 3 to 6, hub 80 has a mounting hole 82 in the center thereof into which drive shaft 32 is inserted. Hub 80 is formed into a ring-shaped body having a blade retaining ring 84 on the outer periphery thereof, and is inserted into a portion extending from the upper end of tubular body 72 to an inner ledge 73 on the inner periphery of the upper end of the tubular body such that blade retaining ring 84 is exposed to the upper end surface of tubular body 72. The bottom of inner ledge 73 is open, and a recess 62 is formed here in which the nut in the form of fastener 36 is accommodated therein. Blade retaining ring 84 clamps rotary blade 50 between blade retaining ring 84 and blade rest surface 44 of the blade rest sleeve. An annular protruding rib 86 is formed on the supper surface of the blade retaining ring 84 so as to be pressed against the lower surface of rotary blade 50. The blade retaining ring 84 is formed with through-holes 85 which are circumferentially arranged at equal intervals. The through-holes 85 are filled with the resin of the resin body 70 to leave resin sites 75 exposed to the upper surface of blade retaining ring 84. The resin sites 75 lie in the same plane as the upper surface of blade retaining ring 84 and are lower than protruding rib 86. Protruding rib 86 is interrupted in the circumferential direction on the upper surface of blade retaining ring 84 by the lower resin sites 75. Although protruding rib 86 is interrupted, rotary blade 50 can be stably retained as a result of rotary blade 50 being uniformly pressed against the periphery of drive shaft 32 by protruding rib 86 extending in the circumferential direction.

The upper edges of through-holes 85 formed in blade retaining ring 84 and the upper outer edges of the blade retaining ring are chamfered to form a taper 87 around which the resin extends to enhance a coupling strength between resin body 70 and hub 80 for preventing disengagement of the hub.

Hub 80 is press-formed to have punched out through-holes 85. Even when warp or distortion occurs in retaining ring 84 accompanying with the processing, the presence of the circumferentially extending annular protruding rib 86 at a high level on the surface of blade retaining ring 84 makes it possible to stably press the rib against the rotary blade 50.

The outer surface of flange 74 is finished to have a smooth curved surface facing upward at an angle from the lower surface of tubular body 72, and covers the lower surface of rotary blade 50 at the outer periphery of tubular body 72. The outer peripheral edge of flange 74 is positioned slightly lower than blade retaining ring 84, and as shown in FIG. 2, forms a gap between itself and rotary blade 50. The lower end of tubular body 72 serves as a contact surface that contacts the ground, and the thickness thereof at this portion is greater than that of flange 74, thereby enhancing durability of the ground surface slide guide and therefore prolonging a lifetime until flange 74 is separated out due to wear loss caused by contact with the ground. An indentation 77 that opens to the upper surface of flange 74 is formed in the portion of flange 74 located immediately to the outside of tubular body 72. The indentations 77 are formed at a plurality of locations along the circumferential direction of tubular body 72 for indication of time when the ground surface slide guide has to be replaced due to wear. When the lower surface of flange 74 becomes worn at a portion close to the lower end of the tubular body 72, at least one of indentations 77 penetrates into the lower surface of flange 74, thereby informing a user that it is time to replace the ground surface slide guide. The indentation 77 may be of an arbitrary shape such as a round hole, square hole, conical hole or pyramidal hole.

Figure 8:
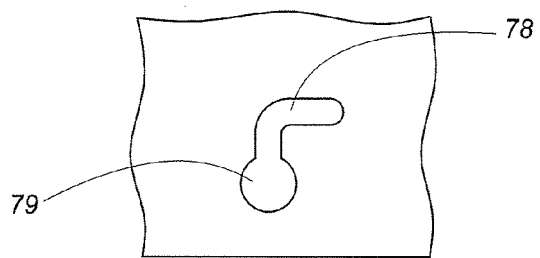
FIG. 8 is a partial view showing a retaining hole for attaching a cutting string to the same ground surface slide guide.

In addition, flange 74 is formed in its outer periphery with retaining holes 78 for removably attaching cutting string 90. Cutting string 90 is a cord made of a synthetic resin, for example, Nylon, and is used to cut various weeds when being driven to rotate together with ground surface slide guide 60. Cutting string 90 is of a length such that the path of rotation followed by the end thereof extends farther than the end of rotary blade 50, and is held to ground surface slide guide 60 by positioning a fastener 92 at the base of the string on the inside of flange 74. Other examples of materials that can be used for cutting string 90 include other synthetic fibers, plant fibers, metal wires and compound materials comprised of combinations thereof. As a result of being provided with such cutting string 90, cutting string 90 can be used in combination with rotary blade 50 for safely cutting grass located near an obstacle D such as a wall, stone or tree without causing the rotary blade to contact with that obstacle D. As shown in FIG. 8, an L-shaped hole can be used as retaining hole 78 to enable easy attachment and removal of cutting string 90. In this case, a large diameter portion 79 is formed in one end of retaining hole 78 to enable fastener 92 to be passed there through, and by making the remaining width smaller than the diameter of fastener 92, attachment and removal of cutting string 90 can be carried out easily from outside flange 74.

Figure 7:
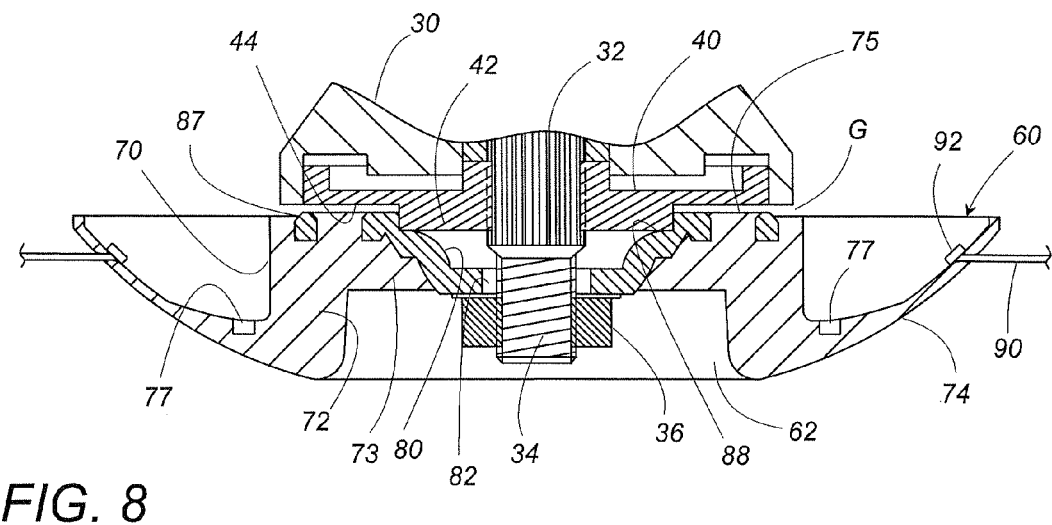
FIG. 7 is a cross-sectional view showing the case of installing only a cutting string on the same grass cutter.

Retaining ring 84 is formed at its inside with an auxiliary retaining ring 88 which is offset downward in the axial direction from the upper surface of blade retaining ring 84. The outer diameter of auxiliary retaining ring 88 is equal to the outer diameter of boss 42 of blade rest 40. The auxiliary retaining ring 88 becomes effective when using cutting string 90 only. Namely, in the case of attaching only ground surface slide guide 60 to drive shaft 32 of the grass cutter and without rotary blade 50, as shown in FIG. 7, auxiliary retaining ring 88 comes into contact with boss 44 of blade rest 40 and leaving a gap G between the two clamping surfaces, i.e., precision-finished blade rest surface 44 and the upper surface of blade retaining ring 84, thereby avoiding these surfaces from being subjected to damage.

Figure 9:
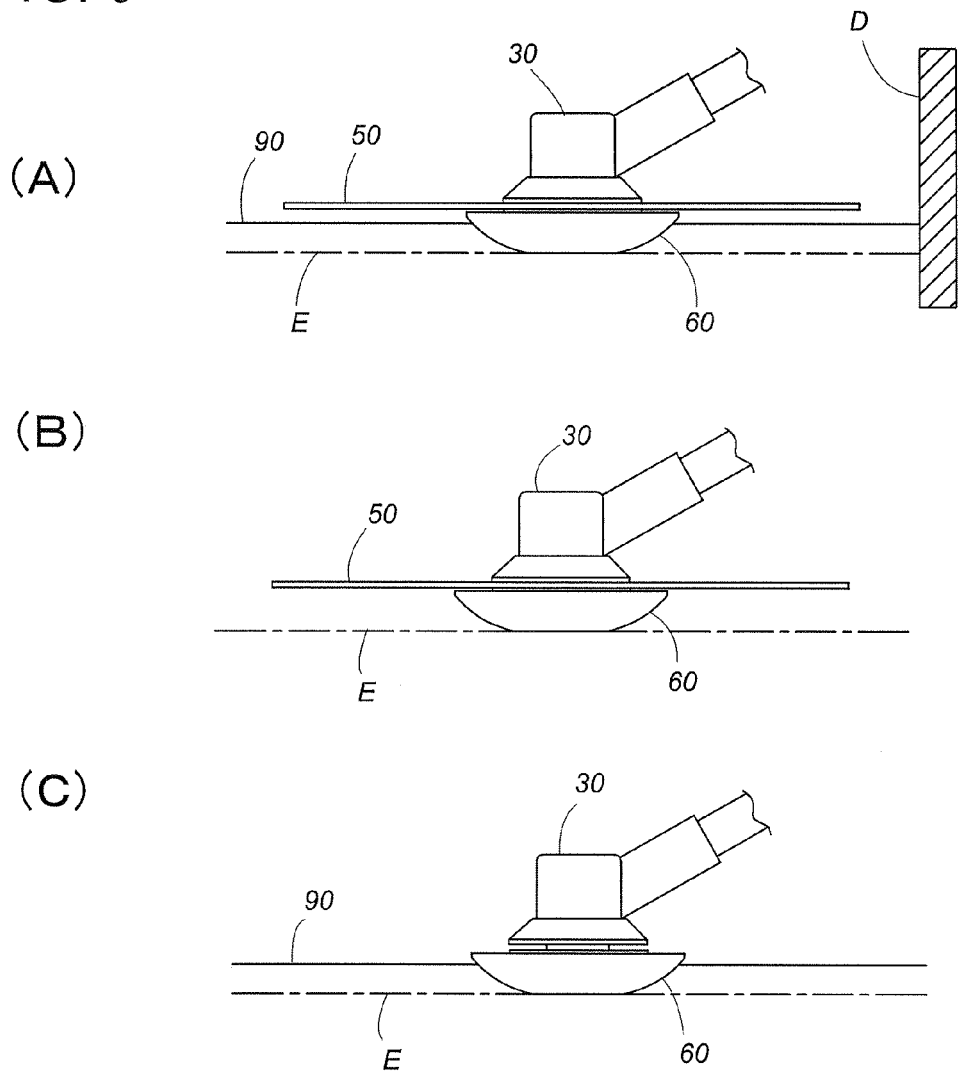
FIGS. 9A, 9B and 9C are schematic drawings respectively showing the case of combining the use of a rotary blade and cutting string, the case of using a rotary blade only, and the case of using a cutting string only in the same grass cutter.

As has been previously described, since cutting string 90 is removably attached to ground surface slide guide 60 of the present invention, grass cutting work can be carried out by combining the use of rotary blade 50 and cutting string 90, by using rotary blade 50 only or by using cutting string 90 only as shown in FIGS. 9A, 9B and 9C.

Figure 10:
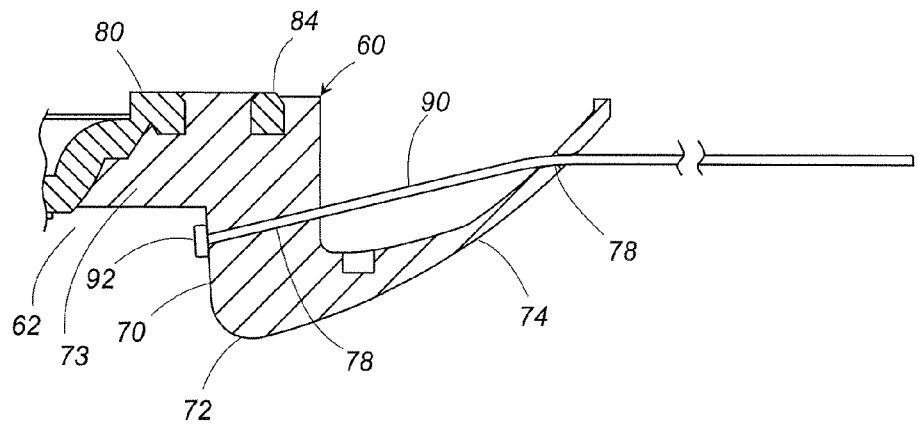
FIG. 10 is a cross-sectional view showing a modification of the same ground surface slide guide.

FIG. 10 shows a modification of the above-mentioned embodiment in which retaining holes 78 for attaching cutting string 90 are formed in tubular body 72 as well as in flange 74 such that cutting string 90 is allowed to be attached and removed on the side of the recess 62 in the bottom of ground surface slide guide 60. Consequently, attachment and removal of cutting string 90 can be carried out with ground surface slide guide 60 still fixed to drive shaft 32.

In the embodiment of a grass cutter as described above, ground surface slide guide 60 is attached to the grass cutter by screwing on a fastener 36 in the form of a nut to male threads 34 in drive shaft 32. In another embodiment of a grass cutter, instead of forming the male threads on the lower end of the drive shaft 32, a threaded hole is formed in the lower end of the drive shaft 32 and the ground surface slide guide 60 is attached to the grass cutter by screwing in the fastener 36 in the form of a headed bolt into this threaded hole.

In the embodiment of the ground surface slide guide as described above, metal hub 80 is formed inserted into resin body 70. In another embodiment of a ground surface slide guide, resin body 70 and hub 80 are formed separately, and resin body 70 and hub 80 may be coupled by inserting resin sites 75, formed in advance to project from the resin body, into the previously described through-holes 85 of hub 80. The manner in which the resin body and hub are coupled may be altered within a range that does not deviate from the spirit of the present invention.

The invention claimed is:

1. A ground surface slide guide for a grass cutter, said ground surface slide guide being attachable to a lower side of a rotary blade to rotate together therewith, said ground surface slide guide comprising a resin body molded of a synthetic resin, and a metal hub integrally coupled to said resin body to rotate together therewith as an integral unit, said resin body comprising a tubular body and a flange extending upwardly and outwardly from the entire periphery of the lower end of said tubular body to cover the lower surface of said rotary blade, said hub being formed at its outer periphery with a blade retaining ring configured to be pressed against the lower surface of the rotary blade and be exposed to the upper surface of said tubular body, said tubular body being formed in its inside with a recess that opens to the lower surface of said ground surface slide guide, said hub being formed in its center with a mounting hole through which a drive shaft can extend such that said rotary blade is fixed to said drive shaft as being clamped between a blade rest and said blade retaining ring by means of a fastener located in said recess when in threaded engagement with the end of said drive shaft, wherein the tubular body has a thickness which is greater towards its lower end than at said flange, and forms a ground contact surface at its lower end, said blade retaining ring is formed with a plurality of circumferentially spaced through-holes, said metal hub is inserted into the resin body with said through-holes being filled with a resin forming said resin body so as to leave resin sites exposed to the upper surface of the blade retaining ring, and said blade retaining ring is formed on it upper surface with a circumferentially extending annular protruding rib that can be pressed against said rotary blade, and said annular protruding rib is interrupted by said resin sites.

2. The ground surface slide guide according to claim 1, wherein
the ground contact surface is in the form of a convex curved surface.

3. The ground surface slide guide according to claim 1, wherein
said flange is formed in its upper surface with a wear-indicative indentation, said flange having a thickness which is less at said indentation than the other portion of said flange.

4. The ground surface slide guide according to claim 1, wherein
a cutting string is removably attached to the resin body.

5. The ground surface slide guide according to claim 1, wherein
said hub is formed at a portion inside of and lower than said blade retaining ring with an auxiliary retaining ring exposed to the inside of the tubular body,
said auxiliary retaining ring is shaped to be engageable with a boss formed at the center of said blade rest and extendable into a center shaft hole of said rotary blade.

6. A grass cutter provided with the ground surface slide guide according to claim 1.

7. A grass cutter provided with the ground surface slide guide according to claim 2.

8. A grass cutter provided with the ground surface slide guide according to claim 3.

9. A grass cutter provided with the ground surface slide guide according to claim 4.

10. A grass cutter provided with the ground surface slide guide according to claim 5.

11. A ground surface slide guide for a grass cutter, said ground surface slide guide being attachable to a lower side of a rotary blade to rotate together therewith,
said ground surface slide guide comprising a resin body molded of a synthetic resin, and a metal hub integrally coupled to said resin body to rotate together therewith as an integral unit,
said resin body comprising a tubular body,
said hub being formed at its outer periphery with a blade retaining ring configured to be pressed against the lower surface of the rotary blade and be exposed to the upper surface of said tubular body,
said tubular body being formed in its inside with a recess that opens to the lower surface of said ground surface slide guide,
said hub being formed in its center with a mounting hole through which a drive shaft can extend such that said rotary blade is fixed to said drive shaft as being clamped between a blade rest and said blade retaining ring by means of a fastener located in said recess when in threaded engagement with the end of said drive shaft,
wherein the tubular body has a ground contact surface at its lower end,
said blade retaining ring is formed with a plurality of circumferentially spaced through-holes,
said metal hub is inserted into the resin body with said through-holes being filled with a resin forming said resin body so as to leave resin sites exposed to the upper surface of the blade retaining ring, and
said blade retaining ring is formed on its upper surface with a circumferentially extending annular protruding rib that can be pressed against said rotary blade, and
said annular protruding rib is interrupted by said resin sites.

* * * * *